(12) United States Patent
Park et al.

(10) Patent No.: US 8,615,243 B2
(45) Date of Patent: Dec. 24, 2013

(54) METHOD OF BROADCASTING AND RECEIVING NEIGHBORING BASE STATION ADVERTISEMENT MESSAGE IN BROADBAND WIRELESS ACCESS SYSTEM, AND HANDOVER METHOD USING THE SAME

(75) Inventors: Chul Park, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

(*) Notice: Subject to any disclaimer, the term of this patent is extended or adjusted under 35 U.S.C. 154(b) by 364 days.

(21) Appl. No.: 12/735,140

(22) PCT Filed: Oct. 14, 2008

(86) PCT No.: PCT/KR2008/006049
§ 371 (c)(1),
(2), (4) Date: Jun. 17, 2010

(87) PCT Pub. No.: WO2009/078570
PCT Pub. Date: Jun. 25, 2009

(65) Prior Publication Data
US 2010/0280890 A1 Nov. 4, 2010

(30) Foreign Application Priority Data
Dec. 17, 2007 (KR) .................. 10-2007-0132625

(51) Int. Cl.
*H04W 36/00* (2009.01)

(52) U.S. Cl.
USPC ........... 455/438; 455/444; 455/436; 370/329; 370/331; 370/324

(58) Field of Classification Search
USPC ......... 455/437, 438, 450, 3.01; 370/331, 332, 370/328, 324
See application file for complete search history.

(56) References Cited

U.S. PATENT DOCUMENTS 6,067,455 A * 5/2000 Endo et al. ............. 455/444
6,842,630 B2 1/2005 Periyalwar
(Continued)

FOREIGN PATENT DOCUMENTS

| EP | 1 715 705 A2 | 10/2006 |
| KR | WO2006/073225 A2 * | 7/2006 |
| WO | WO 2007/109720 A2 | 9/2007 |

OTHER PUBLICATIONS

International Search Report dated Mar. 31, 2009 in connection with International Patent Application No. PCT/KR2008/006049.

(Continued)

*Primary Examiner* — David Q Nguyen

(57) ABSTRACT

The present invention relates to a method of broadcasting and receiving a neighboring base station advertisement message in a wideband wireless access system and a handover method using the same. In the present invention, a base station broadcasts a neighboring base station advertisement message including information that indicates that frequency overlay is supported in neighboring base stations to terminals. The terminal confirms whether frequency overlay is supported in the neighboring base stations included in the neighboring base station advertisement message, and can perform handover to a frequency overlay supporting base station as a destination base station. According to the present invention, when a non-frequency overlay communication system and a frequency overlay communication system are mixed with each other, it is possible to ensure that a frequency overlay supporting terminal performs handover from a base station of a frequency overlay communication system to a base station of another frequency overlay communication system.

20 Claims, 7 Drawing Sheets

(56) References Cited

U.S. PATENT DOCUMENTS

| | | | |
|---|---|---|---|
| 2005/0059401 A1* | 3/2005 | Chen et al. | 455/437 |
| 2005/0096051 A1* | 5/2005 | Lee et al. | 455/438 |
| 2005/0272403 A1* | 12/2005 | Ryu et al. | 455/403 |
| 2006/0030322 A1* | 2/2006 | Kim et al. | 455/436 |
| 2006/0229075 A1* | 10/2006 | Kim et al. | 455/436 |
| 2006/0268677 A1* | 11/2006 | Suh et al. | 370/210 |
| 2007/0010251 A1 | 1/2007 | Cho et al. | |
| 2007/0019584 A1* | 1/2007 | Qi et al. | 370/331 |
| 2007/0097920 A1* | 5/2007 | Chen et al. | 370/331 |
| 2007/0140163 A1* | 6/2007 | Meier et al. | 370/329 |
| 2008/0220788 A1* | 9/2008 | Stanwood et al. | 455/450 |

OTHER PUBLICATIONS

"Part 16: Air Interface for Fixed Broadband Wireless Access Systems", IEEE Standard for Local and metropolitan area networks, 802.16, Oct. 1, 2004, 895 pages.

"Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Standard for Local and metropolitan area networks, Feb. 28, 2006, 864 pages.

"Part 16: Air Interface for Fixed and Mobile Broadband Wireless Access Systems", Draft Standard for Local and metropolitan area networks, Mar. 28, 2007, 518 pages.

* cited by examiner

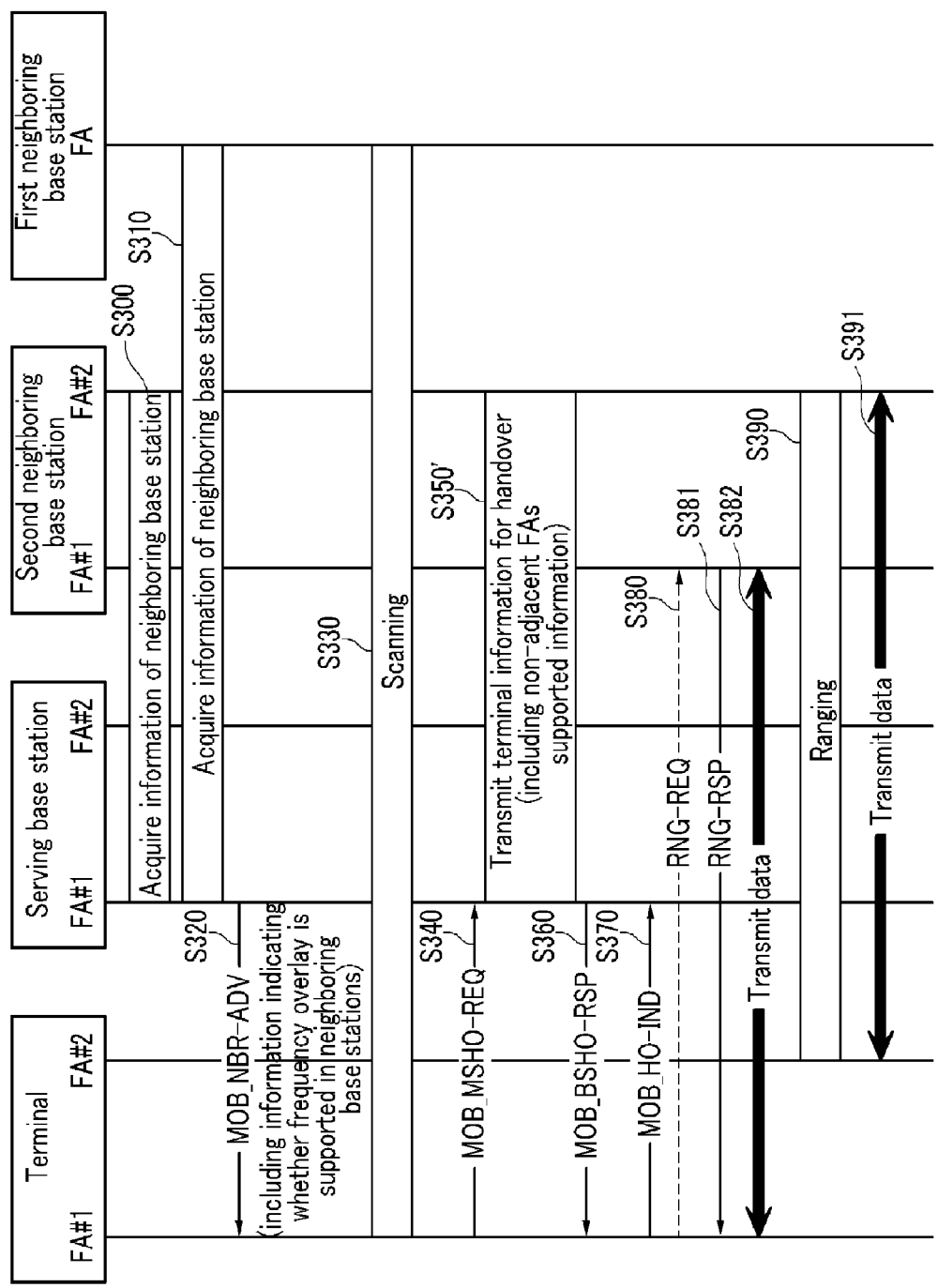

METHOD OF BROADCASTING AND RECEIVING NEIGHBORING BASE STATION ADVERTISEMENT MESSAGE IN BROADBAND WIRELESS ACCESS SYSTEM, AND HANDOVER METHOD USING THE SAME

CROSS-REFERENCE TO RELATED APPLICATION(S)

The present application claims priority under 35 U.S.C. §365 to International Patent Application No. PCT/KR2008/006049 filed Oct. 14, 2008, entitled "METHOD OF BROADCASTING AND RECEIVING NEIGHBORING BASE STATION ADVERTISEMENT MESSAGE IN BROADBAND WIRELESS ACCESS SYSTEM, AND HANDOVER METHOD USING THE SAME". International Patent Application No. PCT/KR2008/006049 claims priority under 35 U.S.C. §365 and/or 35 U.S.C. §119(a) to Korean Patent Application No. 10-2007-0132625 filed Dec. 17, 2007 and which are incorporated herein by reference into the present disclosure as if fully set forth herein.

TECHNICAL FIELD

The present invention relates to a handover method in a wideband wireless access system. Particularly, the present invention relates to a method of broadcasting and receiving neighboring base station advertisement message and a handover method using the same in the case in which a wideband wireless access system supporting frequency overlay and a wideband wireless access system not supporting frequency overlay are mixed.

BACKGROUND ART

A wideband wireless access system defines a terminal (MS), a base station (BS), and a router (ACR) to be compatible with an existing public IP network, and allows the terminal to have mobility, such that the terminal can use an IP-based network service during movement. An existing wideband wireless access system provides a structure in which one terminal enables communication with a base station through a frequency band that belongs to only one frequency assignment (FA).

Meanwhile, as an advanced type of the existing wideband wireless access system, an advanced wideband wireless access system has been suggested in which one terminal can communicate with a base station through a plurality of FAs. In this case, a function of allowing a terminal to communicate with a base station using a plurality of FAs is called a frequency overlay function. According to the advanced wideband wireless access system (hereinafter referred to as "frequency overlay communication system"), a connection structure between a base station and a public IP network is the same as that of the existing wideband wireless access system (hereinafter referred to as "non-frequency overlay communication system"), but a wireless access portion between the base station and the terminal is different from that of the non-frequency overlay communication system. That is, the base station and the terminal can communicate with each other through a plurality of frequency bands that are connected using two or more FAs. The frequency overlay communication system having the above-described structure has the following merits. If a wireless access method between a terminal and a base station and only a function of a MAC layer related to the wireless access method is slightly changed, it is possible to use a frequency band N times wider than that in the non-frequency overlay communication system (on the assumption that one terminal uses two FAs, a frequency band two times wider than that of the non-frequency overlay communication system can be used, and as a result, an available frequency band increases in proportion to the number of FAs used by the terminal). As a result, it is possible to increase a data transmission speed between the terminal and the base station by two times or more (generally, when the number of FAs used between the terminal and the base station is N, the transmission speed is increased N times faster than that of the non-frequency overlay communication system using one FA).

As this frequency overlay communication system is developed, a non-frequency overlay communication system and a frequency overlay communication system are mixed, which provides a mobile communication service to the terminal. As such, in a mobile communication system where a frequency overlay communication system and a non-frequency overlay communication system are mixed and a mobile communication service is provided, it is difficult to ensure that a terminal that is capable of performing a frequency overlay function (hereinafter referred to as "frequency overlay supporting terminal") performs handover to a base station that is capable of performing a frequency overlay function (hereinafter referred to as "frequency overlay supporting base station"). Accordingly, when a frequency overlay supporting terminal that performs communication with a frequency overlay supporting base station using two or more FAs performs handover to a base station under the control of a non-frequency overlay communication system (hereinafter referred to as "frequency overlay non-supporting base station"), the frequency overlay supporting terminal can perform communication using a plurality of FAs. However, since the base station that is subjected to handover is a frequency overlay non-supporting base station, the base station can perform communication using only one FA. Therefore, there is a technical limitation in that the merits of the frequency overlay communication system are not sufficiently available.

Meanwhile, even when a frequency overlay supporting terminal performs handover from a frequency overlay supporting base station to another frequency overlay supporting base station, if a base station to which the frequency overlay supporting terminal performs handover does not know information indicating whether a plurality of FAs that can be used by the frequency overlay supporting terminal can use only adjacent frequency bands or both adjacent frequency bands and non-adjacent frequency bands, the following problem occurs. The frequency overlay supporting terminal can perform communication using only one FA depending on whether FAs allocated by the frequency overlay supporting base station are adjacent to each other.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of broadcasting and receiving a neighboring base station advertisement message in a wideband wireless access system, having advantages of allowing a base station to broadcast information indicating whether frequency overlay is supported in neighboring base stations to terminals, and the terminals to receive the information and know whether frequency overlay is supported in the neighboring base stations.

The present invention has been made in an effort to provide a handover method, having advantages of allowing a frequency overlay supporting terminal to perform handover between frequency overlay supporting base stations in a communication system in which a frequency overlay communication system and a non-frequency overlay communication system are mixed.

The present invention has been made in an effort to provide a handover method, having advantages of, when a frequency overlay supporting terminal performs handover between frequency overlay supporting base stations, allowing the frequency overlay supporting terminal to perform handover between frequency overlay supporting base stations according to whether the frequency overlay supporting terminal uses only FAs of neighboring frequency bands.

Technical Solution

An exemplary embodiment of the present invention provides a method of broadcasting a neighbor base station advertisement message in a base station of a wideband wireless access system. The method includes exchanging information with neighboring base stations to confirm whether frequency overlay is supported in each of the neighboring base stations; generating a neighboring base station advertisement message that includes information obtained by confirming whether frequency overlay is supported in each of the neighboring base stations; and broadcasting the generated neighboring base station advertisement message to terminals that belong to a coverage of the base station.

Another exemplary embodiment of the present invention provides a method of receiving a neighboring base station advertisement message in a terminal of a wideband wireless access system. The method includes receiving a neighboring base station advertisement message broadcast from a base station, the neighboring base station advertisement message including information indicating whether frequency overlay is supported in each of neighboring base stations; confirming whether frequency overlay that is included in the neighboring base station advertisement message is supported in each of the neighboring base stations; and storing information that indicates whether frequency overlay is supported in each of the neighboring base stations.

Still another exemplary embodiment of the present invention provides a handover method in which a base station of a wideband wireless access system performs handover. The handover method includes broadcasting a neighboring base station advertisement message including information of neighboring base stations, the neighboring base station advertisement message including information indicating whether frequency overlay is supported in each of the neighboring base stations; receiving a list of candidate base stations where handover is possible from the terminal, the candidate base stations being selected on the basis of the information included in the broadcast neighboring base station advertisement message and indicating whether frequency overlay is supported, and transmitting handover information of the terminal to the candidate base stations; selecting a recommended base station from among the candidate base stations and transmitting information of the recommended base station to the terminal; and receiving a handover instruction from the terminal.

A further exemplary embodiment of the present invention provides a handover method in which a terminal of a wideband wireless access system performs handover. The method includes receiving a neighboring base station advertisement message that is broadcast from a base station and includes information of neighboring base stations, the neighboring base station advertisement message including information indicating whether frequency overlay is supported in each of the neighboring base stations; when handover is performed, selecting candidate base stations for the handover from among the neighboring base stations on the basis of the information indicating whether frequency overlay is supported that is included in the neighboring base station advertisement message and transmitting information of the candidate base stations to the base station; selecting one destination base station from among the candidate base stations included in the information transmitted from the base station and instructing the base station to perform handover; and performing handover to the destination base station.

Advantageous Effects

According to the present invention, when a non-frequency overlay communication system and a frequency overlay communication system are mixed with each other, it is possible to ensure that a frequency overlay supporting terminal performs handover from a base station of a frequency overlay communication system to a base station of a frequency overlay communication system.

Further, when a frequency overlay supporting terminal performs handover between base stations in a frequency overlay communication system, information indicating whether non-adjacent frequency bands can be used between a plurality of FAs used by a terminal is transmitted to a destination base station. Therefore, the destination base station that operates a plurality of FAs can manage each terminal according to the capability thereof.

BRIEF DESCRIPTION OF THE DRAWINGS

FIG. 7 is a flowchart illustrating a case in which contents that are related to transmitting information indicating whether FAs of a terminal can use non-adjacent frequency bands to candidate base stations are included in FIG. 6.

MODE FOR THE INVENTION

Figure 1:
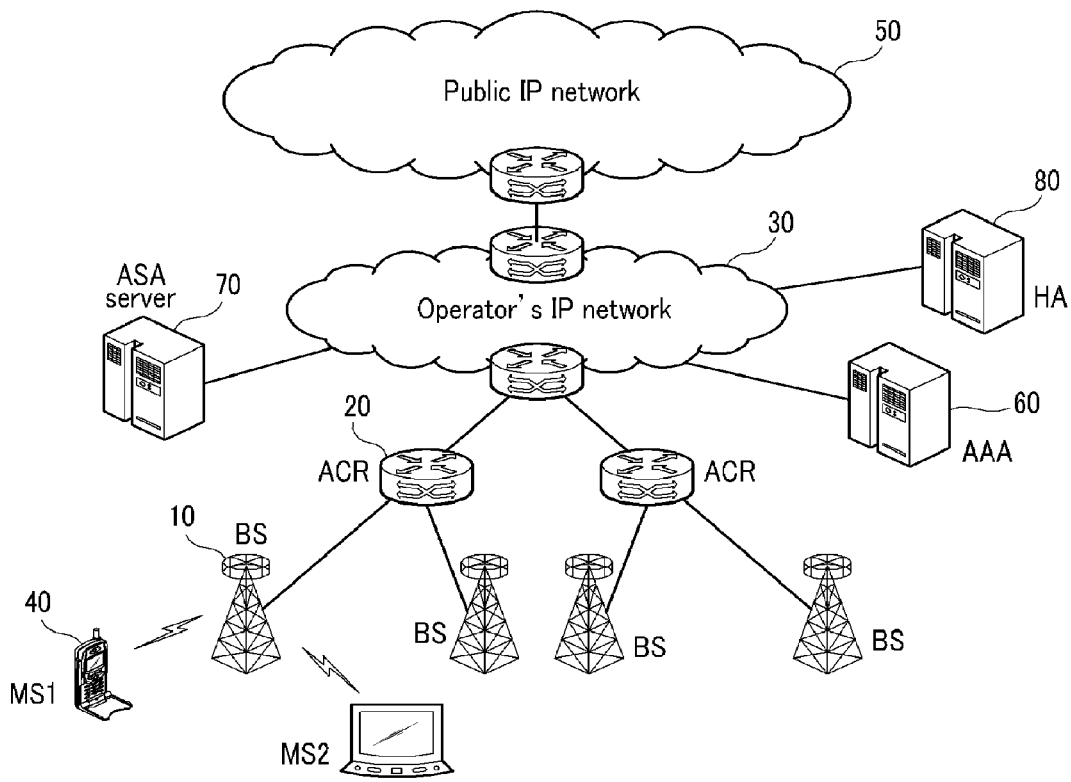
FIG. 1 is a diagram schematically illustrating a general non-frequency overlay communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "unit", "-er (-or)", and "module" used herein mean a unit that processes at least one function or operation. This can be implemented by hardware, software, or a combination thereof.

In this specification, a terminal (MS) may designate a mobile station (MS), a terminal, a mobile terminal (MT), a subscriber station (SS), a portable subscriber station (PSS), user equipment (UE), or an access terminal (AT), and include a part or all of functions of the mobile terminal, the subscriber station, the portable subscriber station, and the user equipment.

In the present specification, a base station (BS) may designate an access point (AP), a radio access station (RAS), a node B, a base transceiver station (BTS), or a mobile multihop relay (MMR)-BS, and include a portion or all of functions thereof.

Hereinafter, a handover method according to an exemplary embodiment of the present invention will be described in detail with reference to the accompanying drawings.

FIG. 1 is a diagram schematically illustrating a general non-frequency overlay communication system.

As shown in FIG. 1, in the non-frequency overlay communication system, a base station (BS) 10 is connected to a certain operator's IP network 30 through a router (ACR) 20. Accordingly, in order for a subscriber to use an IP-based service through a terminal (MS) 40, the subscriber needs to use a terminal 40 that has access to a public IP network 50 through the base station 10, the router 20, and the operator's IP network 30.

The operator's IP network 30 includes an AAA server 60, an ASA server 70, and an HA server 80. The AAA server 60 and the ASA server 70 perform a function of storing QoS information and authentication information on a subscriber who desires to use the terminal 40 to have access to a non-frequency overlay communication system, and the HA server 80 performs a home agent function for the terminal 40.

In the non-frequency overlay communication system, the terminal 40 can use an IP-based network service through the base station 10, the router 20, and the operator's IP network 30 even during movement. However, in the non-frequency overlay communication system, the terminal 40 can communicate with the base station 10 through only one FA.

In order to resolve this drawback, a frequency overlay communication system that provides a frequency overlay function has been suggested, which makes it possible for a terminal and a base station to communicate with each other through a plurality of FAs. The structure between the base station 10 and the public IP network 50 in the frequency overlay communication system is the same as that in the non-frequency overlay communication system according to the related art, except for the structure between the base station 10 and the terminal 40. Therefore, only different structures therebetween will be described.

Figure 2:
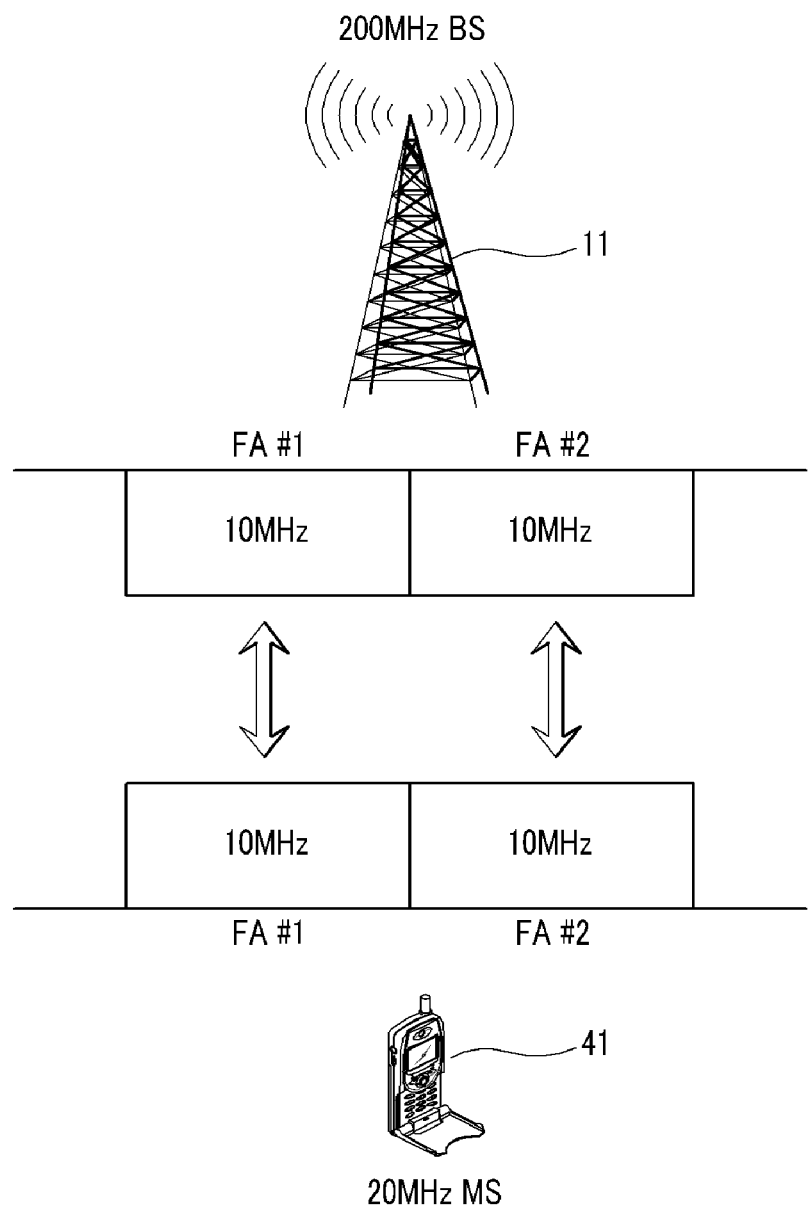
FIG. 2 is a diagram schematically illustrating a wireless access method between terminals and base stations in a general frequency overlay communication system.

FIG. 2 is a diagram schematically illustrating a wireless access method between terminals and base stations in a general frequency overlay communication system.

As shown in FIG. 2, in the frequency overlay communication system, a base station 11 can communicate with a frequency overlay supporting terminal 41 that is capable of performing a frequency overlay function using a plurality of FAs. Accordingly, the base station 11 becomes a frequency overlay supporting base station.

As such, in the frequency overlay communication system, the base station 11 and the terminal 41 can communicate with each other through a plurality of FAs. In FIG. 2, for better comprehension and ease of description, it is assumed that only two FAs (FA#1 and FA#2) are used.

Referring to FIG. 2, the terminal 41 uses the two FAs (FA#1 and FA#2) to perform communication with the base station 11. That is, the terminal 41 can perform communication with the base station 11 through a 10 MHZ band of the FA (FA#2) that is different from a 10 MHz band of the FA (FA#1).

In this case, the terminal 41 can use a band that is twice as wide as a band used by the terminal 40 in the non-frequency overlay communication system shown in FIG. 1. As a result, the transmission speed between the terminal 41 and the base station 10 can become approximately twice as fast as the transmission speed between the terminal 40 and the base station 10.

Meanwhile, a system in which the non-frequency overlay communication system shown in FIG. 1 and the frequency overlay communication system shown in FIG. 2 are mixed may be provided, and in which a mobile communication service can be provided to a terminal.

In this case, when the frequency overlay supporting terminal 41 and the frequency overlay supporting base station 11 communicate with each other through two FAs and handover needs to be performed to a neighboring base station, it is impossible to determine whether the neighboring base station is a frequency overlay supporting base station.

Accordingly, when the frequency overlay supporting terminal 41 performs handover to a neighboring frequency overlay supporting base station, the frequency overlay supporting terminal 41 can continuously communicate with the base station that is subjected to handover using the two FAs. However, when the frequency overlay supporting terminal 41 performs handover to a neighboring base station, the frequency overlay supporting terminal 41 should communicate with the corresponding base station using only one FA rather than the neighboring frequency overlay supporting base station. The terminal 41 can perform communication using a plurality of FAs, but due to the capability of the base station that is subjected to the handover, it may become impossible to maximally use the terminal 41.

Therefore, in order to solve the above-described problems, in the exemplary embodiment of the present invention, a frequency overlay supporting base station that communicates with a frequency overlay supporting terminal exchanges information with its neighboring base stations in advance to determine whether frequency overlay is supported in the neighboring base stations. The frequency overlay supporting base station broadcasts the information to all terminals within its service radius, such that a frequency overlay supporting terminal that desires to perform handover performs handover to a frequency overlay supporting base station among the neighboring base stations.

In order to support a handover function of the terminals, the communication systems that ensure mobility of the terminals broadcast network configuration information including information on the neighboring base stations to the terminals, as a process before a handover process. The base stations in the frequency overlay communication system and the non-frequency overlay communication system transmit an advertisement message to the terminals within their radiuses through a mobile neighbor advertisement (MOB_NBR-ADV) message that is a neighboring base station advertisement message. At this time, it is possible to broadcast the neighboring base station advertisement message that includes the information obtained to the terminals by causing the base station to determine whether frequency overlay is supported in the neighboring base stations.

Therefore, the frequency overlay supporting terminals within the coverage of the base station receive and store the neighboring base station advertisement message broadcast from the base station. At the time of handover, the frequency overlay supporting terminals select frequency overlay supporting base stations and perform handover thereto.

Figure 3:
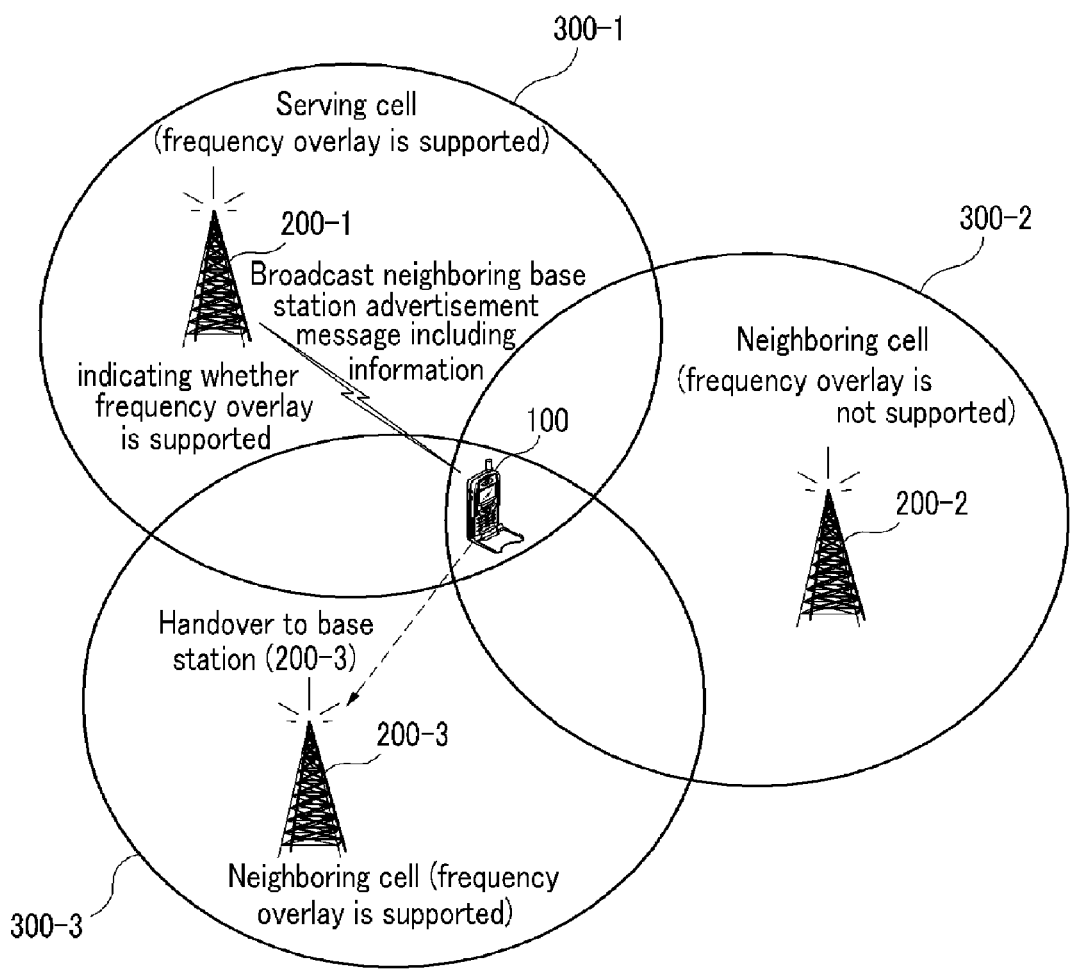
FIG. 3 is a diagram schematically illustrating a handover method according to an exemplary embodiment of the present invention.

FIG. 3 is a diagram schematically illustrating a handover method according to an exemplary embodiment of the present invention.

As shown in FIG. 3, a terminal 100 is a frequency overlay supporting terminal, base stations 200-1 and 200-3 are frequency overlay supporting base stations, and a base station 200-2 is a frequency overlay non-supporting base station. Accordingly, a frequency overlay service is provided within a cell 300-1 corresponding to a coverage of the base station 200-1 and a cell 300-3 corresponding to a coverage of the base station 200-3. However, a frequency overlay service is impossible within a cell 300-2 corresponding to a coverage of the base station 200-2, and terminals in the corresponding area should perform communication using only one FA.

In this state, a case may be generated in which the terminal 100 as the frequency overlay supporting terminal needs to perform handover from the cell 300-1 (hereinafter referred to as "serving cell") of the base station 200-1 (hereinafter referred to as "serving base station") as the frequency overlay supporting base station to the base station 200-2 (hereinafter referred to as "first neighboring base station") as the frequency overlay non-supporting base station or the base station 200-3 (hereinafter referred to as "second neighboring base station") as the frequency overlay supporting base station.

Meanwhile, the serving base station 200-1 broadcasts a neighboring base station advertisement message to all terminals within the serving cell 300-1, which includes information indicating whether frequency overlay is supported in the base stations adjacent to the terminal 100 periodically or at a certain time, that is, the first neighboring base station 200-2 and the second neighboring base station 200-3. Accordingly, the terminal 100 within the serving cell 300-1 also receives the neighboring base station advertisement message broadcast from the serving base station 200-1, and can know information of the base stations adjacent to the terminal 100, for example the first neighboring base station 200-2 and the second neighboring base station 200-3, particularly, information indicating whether frequency overlay is supported in the first neighboring base station 200-2 and the second neighboring base station 200-3. In this case, the terminal 100 can know that the first neighboring base station 200-2 is a frequency overlay non-supporting base station and the second neighboring base station 200-3 is a frequency overlay supporting base station.

Accordingly, when the terminal 100 needs to perform handover to another base station under the control of the serving base station 200-1, and the first neighboring base station 200-2 and the second neighboring base station 200-3 exist as the neighboring base stations, the terminal 100 performs handover to the second neighboring base station 200-3 as a frequency overlay supporting base station. Therefore, even if the terminal 100 performs handover to the second neighboring base station 200-3 while using a frequency overlay function under the control of the serving base station 200-1, the terminal 100 can continuously use a frequency overlay function.

As described above, in the exemplary embodiment of the present invention, after confirming whether frequency overlay is supported in the first and second neighboring base stations 200-2 and 200-3, the serving base station 200-1 should broadcast the neighboring base station advertisement message that includes information indicating the confirmed result. At this time, the neighboring base station advertisement message that is broadcast from the serving base station 200-1 includes the number of neighboring base stations (N_NEIGHBORS), identification factors of neighboring base stations (Neighbor BSID), channel information of neighboring base stations (Preamble Index/Subchannel Index), and TLV parameters (TLV Encoded Neighbor information) that allow parameters in a form of TLV to be additionally defined and used.

The neighboring base station advertisement message is used according to the standard defined by the wideband wireless access systems, such as IEEE802.16-2004, IEEE802.16e-2005, and IEEE 802.16-2004/Cor2/D3, and the detailed description thereof will be omitted herein.

The information indicating whether frequency overlay is supported in the neighboring base stations that corresponds to the characteristic of the exemplary embodiment of the present invention is defined by the TLV parameters of the neighboring base station advertisement message and broadcast.

The following Table 1 shows a format of TLV parameters that are newly defined in the neighboring base station advertisement message.

TABLE 1

| Name | Type | Length | Value (variable length) | Scope |
|---|---|---|---|---|
| NEIGHBOR_FO | TBD | 1 | Display whether frequency overlay is supported in neighboring bases Bit#0: 1, frequency overlay is supported 0, frequency overlay is not supported Bit#1 to Bit#7: Reserved | MOB_NBR-ADV |

Referring to Table 1, the TLV parameters that are defined in the neighboring base station advertisement message include type, length, and value (TLV). The TLV parameter name is NEIGHBOR_FO (frequency overlay), which indicates a parameter that represents information indicating whether frequency overlay is supported in the neighboring base station, the type thereof is arbitrarily defined, and the length thereof is 1 byte. When a Bit#0 (i.e., LSB) value as the parameter value is "1", the neighboring base station is a frequency overlay supporting base station, which indicates that multiple FAs are supported. When the Bit#0 (i.e., LSB) value is "0", the neighboring base station is a frequency overlay non-supporting base station, which indicates that multiple FAs are not supported. For example, when the serving base station 200-1 broadcasts the neighboring base station advertisement message, as the value of the NEIGHBOR_FO parameter that is included in the neighboring base station advertisement message, the Bit#0 value that corresponds to the first neighboring base station 200-2 is "0", and the Bit#0 value that corresponds to the second neighboring base station 200-3 is "1". Therefore, if referring to the value of the TLV parameter that is included in the neighboring base station advertisement message broadcast from the serving base station 200-1, the terminal 100 can know that the second neighboring base station 200-3 is a base station supporting multiple FAs where frequency overlay is supported. Thus, at the time of handover, the terminal 100 can perform handover to the second neighboring base station 200-3, not the first neighboring base station 200-2.

Figure 4:
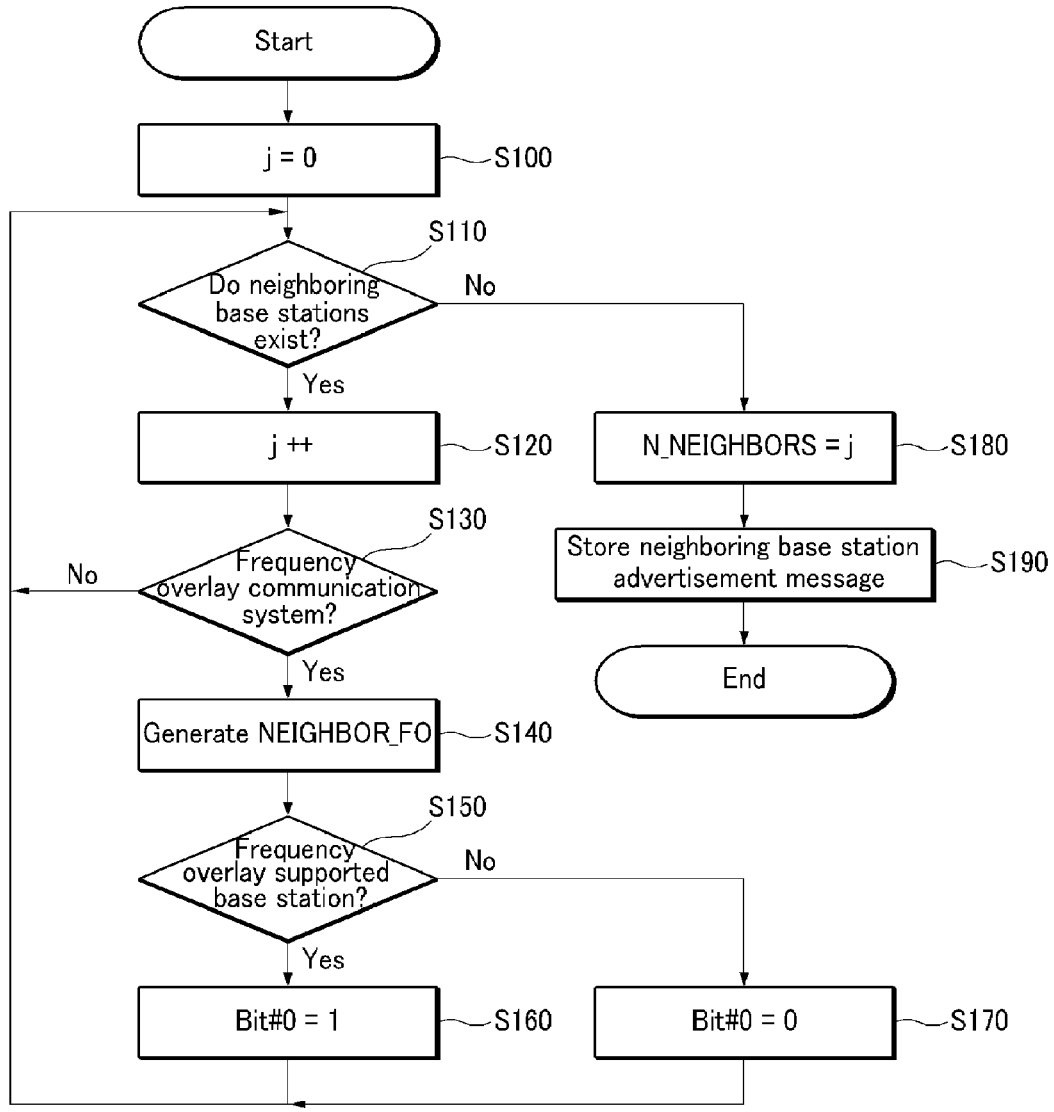
FIG. 4 is a flowchart illustrating a method in which a serving base station according to an exemplary embodiment of the present invention generates a neighboring base station advertisement message.

FIG. 4 is a flowchart illustrating a method in which a serving base station according to an exemplary embodiment of the present invention generates a neighboring base station advertisement message.

Referring to FIGS. 3 and 4, first, the serving base station 200-1 sets a value of j as a variable used to count the number of neighboring base stations to "0" (S100). Then, the serving base station 200-1 determines whether the neighboring base stations exist (S110). In the example shown in FIG. 3, since the number of neighboring base stations is two, it is determined in step S110 that the neighboring base stations exist, and the value of j is increased to "1" (S120). Accordingly, the condition j=1 is satisfied, which means that the current counted number of neighboring base stations is 1. In this case, it is assumed that the first neighboring base station corresponds to the first neighboring base station 200-2 shown in FIG. 3.

Then, the serving base station 200-1 confirms whether the first neighboring base station 200-2 is a base station in a frequency overlay communication system (S130). If the first neighboring base station 200-2 is not a base station in the frequency overlay communication system, the serving base station 200-1 repeats steps S110, S120, and S130, and confirms whether the neighboring base station is a base station in the frequency overlay communication system.

Therefore, in FIG. 3, the second neighboring base station 200-3 exists, and thus the condition j=2 is satisfied. The second neighboring base station 200-3 is a base station in the frequency overlay communication system, and thus step S130 is satisfied.

Then, the serving base station 200-1 generates a NEIGHBOR_FO parameter as the TLV parameter in the neighboring base station advertisement message with respect to the second neighboring base station 200-3 (S140), and determines again whether the second neighboring base station 200-3 is a frequency overlay supporting base station (S150). This is made in consideration of the case where, even though the neighboring base station is a base station in the frequency overlay communication system, it may not operate according to a frequency overlay system that supports multiple FAs at a certain point of time. If the neighboring base station is not a base station that belongs to the frequency overlay communication system, the serving base station 200-1 does not generate the TLV parameter with respect to the corresponding neighboring base station.

In step S150, it is confirmed that the second neighboring base station 200-3 is a frequency overlay supporting base station. Thus, the Bit#0 as a least significant bit of the NEIGHBOR_FO parameter is set to 1 (S160). However, if the corresponding neighboring base station is not a base station that operates according to a frequency overlay system, the Bit#0 as the least significant bit of the NEIGHBOR_FO parameter is set to 0 (S170).

Then, step S110 is repeated to confirm whether another neighboring base station exists. If another neighboring base station exists, steps S120 to S170 are repeated. However, like the example that is shown in FIG. 3, if another neighboring base station does not exist, the value of j as a variable that is used to count the number of neighboring base stations is set to the N_NEIGHBOR value that indicates the number of neighboring base stations included in the neighboring base station advertisement message (S180). Then, the neighboring base station advertisement message that is generated through the above-described process is stored (S190). The serving base station 200-1 broadcasts the stored neighboring base station advertisement message to all terminals in the serving base station at a certain time or periodically.

As such, among the neighboring base stations, in the case of a base station that is a base station in the frequency overlay communication system and supports frequency overlay, the information of the corresponding base station is described as the TLV parameter value in the neighboring base station advertisement message and broadcast to the terminals.

Figure 5:
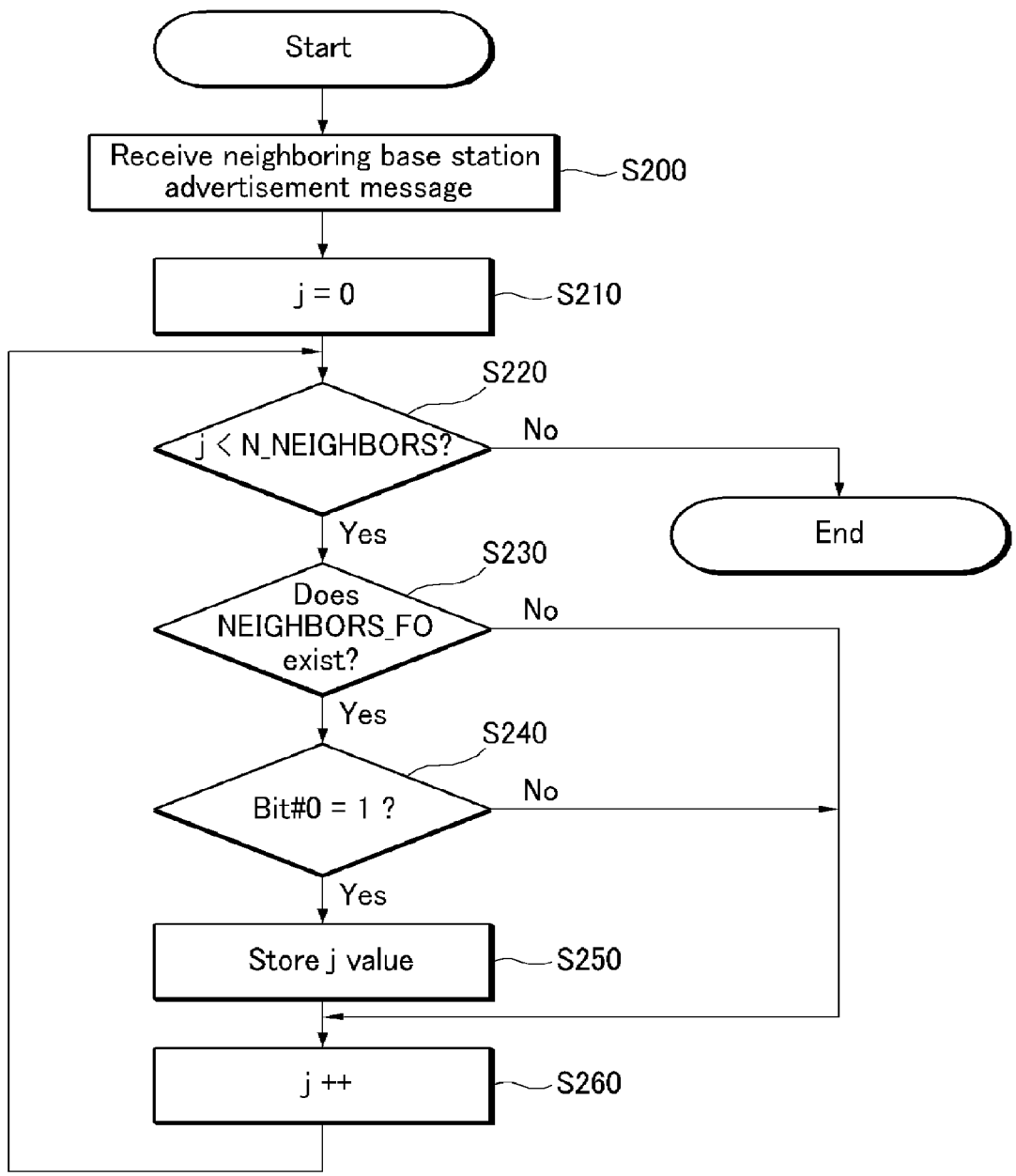
FIG. 5 is a flowchart illustrating a method in which a terminal according to an exemplary embodiment of the present invention receives a neighboring base station advertisement message.

FIG. 5 is a flowchart illustrating a method in which a terminal according to an exemplary embodiment of the present invention receives a neighboring base station advertisement message.

Referring to FIGS. 3 and 5, first, the terminal 100 receives from the serving base station 200-1 the neighboring base station advertisement message that includes information on the neighboring base station (S200). The terminal 100 sets the value of j as a variable used to count the number of neighboring base stations to "0" (S210).

Then, the terminal 100 compares the value of N_NEIGHBORS indicating the number of neighboring base stations described in the neighboring base station advertisement message and the value of j and determines whether the value of j is smaller than the value of the N_NEIGHBORS (S220). If referring to the example that is shown in FIG. 3, since two neighboring base stations exist, it is determined in this step that the value of the N_NEIGHBORS is larger than the value of j. Since the first neighboring base station between the two neighboring base stations is the first neighboring base station 200-2, the first neighboring base station corresponds to the first neighboring base station 200-2 in the following steps.

The terminal 100 confirms whether a parameter of NEIGHBOR_FO exists as the TLV parameter for the second neighboring base station 200-2 in the neighboring base station advertisement message (S230). In this case, if the parameter of NEIGHBOR_FO exists, it can be determined that the corresponding neighboring base station is a base station that belongs to the frequency overlay communication system as an advanced system. If the parameter of NEIGHBOR_FO does not exist, it can be determined that the corresponding neighboring base station is a base station that belongs to the non-frequency overlay communication system as the existing system. In this case, since the first neighboring base station 200-2 as a base station that corresponds to j=1 is a base station that belongs to a non-frequency overlay communication system, it is unnecessary to know whether frequency overlay is supported. Thus, in order to confirm another neighboring base station, after increasing the value of j to "1", steps S220 and S230 are repeated (S260).

The following neighboring base station is the second neighboring base station 200-3 that belongs to the frequency overlay communication system. Since conditions in step 230 are satisfied, the terminal 100 confirms whether the value of the least significant bit Bit#0 in the NEIGHBOR_FO parameter is "1" (S240).

In this case, the second neighboring base station 200-3 is a frequency overlay supporting base station that supports multiple FAs, and thus the value of Bit#0 is described as "1". Accordingly, step S240 is satisfied, and thus the terminal 100 stores a value of j=1 and confirms that the second neighboring base station 200-3 is a handover supporting base station (S250).

Then, if the value of j is increased again to "1", the value of j becomes larger than the value of N_NEIGHBORS. Thus, step S220 is not satisfied and the entire process ends.

As such, the terminal 100 receives the neighboring base station advertisement message that is broadcast from the serving base station 200-1 and can know a base station that is in the frequency overlay communication system among the neighboring base stations and supports frequency overlay in accordance with information indicating whether frequency overlay is supported, which is included in the neighboring base station advertisement message.

Hereinafter, a handover method according to an exemplary embodiment of the present invention will be described with reference to FIGS. 3 and 6.

In this case, for better comprehension and ease of description, as shown in FIG. 3, it is assumed that there are only the first neighboring base station 200-2 and the second neighboring base station 200-3 as the neighboring base stations. However, the technical range of the present invention is not limited thereto, and may be applied to the case in which the number of neighboring base stations is two or more.

Further, in the present exemplary embodiment, it is assumed that a frequency overlay function between the terminal 100 and the serving base station 200-1 is performed through two FAs, for example, FA#1 and FA#2. The terminal 100 and the serving base station 200-1 can communicate with each other using three or more FAs. However, for better comprehension and ease of description, it is assumed that only two FAs are used. It is assumed that, if the terminal 100 and the serving base station 200-1 perform all control operations through FA#1 and data transmission through FA#1 becomes possible, a procedure of transmitting data through FA#2 is performed.

First, the serving base station 200-1 performs neighboring base station information acquiring processes S300 and S310 with the first neighboring base station 200-2 and the second neighboring base station 200-3 as the neighboring base stations through FA#1. The serving base station 200-1 receives information of the neighboring base stations, in particular, information indicating whether frequency overlay is supported as multiple FA support information of the corresponding neighboring base stations. The serving base station 200-1 may describe the received information of the neighboring base stations, in particular, information indicating whether frequency overlay is supported in the neighboring base station advertisement message, and stores it, as described with reference to FIG. 4.

Accordingly, the serving base station 200-1 broadcasts the MOB_NBR-ADV message as the neighboring base station advertisement message through the FA#1 periodically or at a certain time, such that all terminals within the serving cell 300-1 of the serving base station 200-1 can receive the message (S320).

The terminal 100 also receives the MOB_NBR-ADV message broadcast from the serving base station 200-1 through FA#1 and can know information of the neighboring base stations. In particular, as described with reference to FIG. 5, the terminal 100 can know that the first neighboring base station 200-2 is a frequency overlay non-supporting base station and the second neighboring base station 200-3 is a frequency overlay supporting base station.

Then, the terminal 100 performs a scanning process of measuring quality of downlink signals received from the neighboring base stations through FA#1 and acquiring network information with the neighboring base stations (S330).

The terminal 100 determines candidate base stations that are subjected to handover on the basis of the information of the neighboring base stations obtained by steps described above, particularly, the information indicating whether frequency overlay is supported. The number of candidate base stations may be one or more. In the present exemplary embodiment, since the first neighboring base station 200-2 is not a frequency overlay supporting base station, the terminal 100 determines the second neighboring base station 200-3 as the candidate base station that is subjected to handover. If a frequency overlay supporting base station as another neighboring base station exists in addition to the second neighboring base station 200-3, the corresponding base station may be included in a list of candidate base stations.

Then, the terminal 100 carries a list of candidate base stations that are capable of being subjected to handover in a mobile station handover request (MOB_MSHO-REQ) message as an MS handover request message, and transmits the mobile station handover request message through FA#1 to the serving base station 200-1 (S340).

Therefore, the serving base station 200-1 transmits session information and setting information of the terminal 100 that has requested to perform handover through FA#1 to the second neighboring base station 200-3 as a candidate base station (S350). The serving base station 200-1 includes a list of recommended base stations among the corresponding candidate base stations in a mobile base station handover response (MOB_BSHO-RSP) message as a BS handover response message and transmits the mobile base station handover response message to the terminal 100 (S360). In the exemplary embodiment of the present invention, only the second neighboring base station 200-3 is included as the candidate base station, and thus the recommended base station also becomes the second neighboring base station 200-3.

Then, the terminal 100 determines a destination base station among the recommended base stations. In the present exemplary embodiment, the terminal 100 determines the second neighboring base station 200-3 as a destination base station. The terminal 100 includes information of the determined destination base station, that is, information of the second neighboring base station 200-3 in a mobile handover indication (MOB_HO-IND) message as a handover instruction message, transmits the mobile handover indication message through FA#1 to the serving base station 200-1, and performs handover immediately after the transmission (S370). That is, in order to perform handover to the second neighboring base station 200-3 as the destination base station, the terminal 100 performs synchronization with the second neighboring base station 200-3 through FA#1 and performs a network entrance procedure. For this purpose, the terminal 100 transmits a ranging request (RNG-REQ) message through F#1 to the second neighboring base station 200-3 (S380), and receives a ranging response (RNG-RSP) message from the second neighboring base station 200-3 through FA#1 (S381). At this time, the second neighboring base station 200-3 determines another FA (i.e., FA#2 in the present exemplary embodiment) to be used by a terminal that will perform handover, and transmits the ranging response message including the information of another FA to the terminal 100. As such, if the terminal 100 completely performs a network entrance procedure on the second neighboring base station 200-3 through FA#1, data transmission through FA#1 becomes possible between the terminal 100 and the second neighboring base station 200-3 (S382).

Then, if a ranging procedure S390 through FA#2 is completely performed between the terminal 100 and the second neighboring base station 200-3, data transmission through FA#2 becomes possible between the terminal 100 and the second neighboring base station 200-3 (S391).

As described above, the serving base station 200-1 broadcasts the neighboring base station advertisement message that includes information indicating whether frequency overlay is supported in the neighboring base stations, and the frequency overlay supporting terminal 100 can perform handover to a neighboring base station where frequency overlay is supported among the neighboring base stations.

Meanwhile, according to the above-described handover method, the terminal 100 can perform handover from the serving base station 200-1 to the second neighboring base station 200-3 where frequency overlay is supported. However, if the terminal 100 can perform communication using a plurality of FAs having only non-adjacent frequency bands and FA#2 that is informed through the ranging response message in step 381 has a frequency band not adjacent to that of FA#1, the terminal 100 that has performed handover from the serving base station 200-1 to the second neighboring base station 200-3 can perform communication using only one FA.

Accordingly, in order to solve the above-described problem, when the serving base station 200-1 receives a handover request (MOB_MSHO-REQ) message from the terminal 100, the serving base station 200-1 transmits to the candidate base station information indicating whether the terminal 100 can use non-adjacent frequency bands. Therefore, the handover candidate base stations of the terminal 100 can previously know whether FAs of the terminal 100 can use non-adjacent frequency bands before the terminal 100 performs handover. Thus, when the terminal 100 actually performs handover, it becomes possible to perform communication depending on the capability of the terminal 100.

FIG. 7 shows a process when the serving base station 200-1 transmits information indicating whether the terminal 100 uses FAs having non-adjacent frequency bands to perform communication to the candidate base station 200-3.

Figure 6:
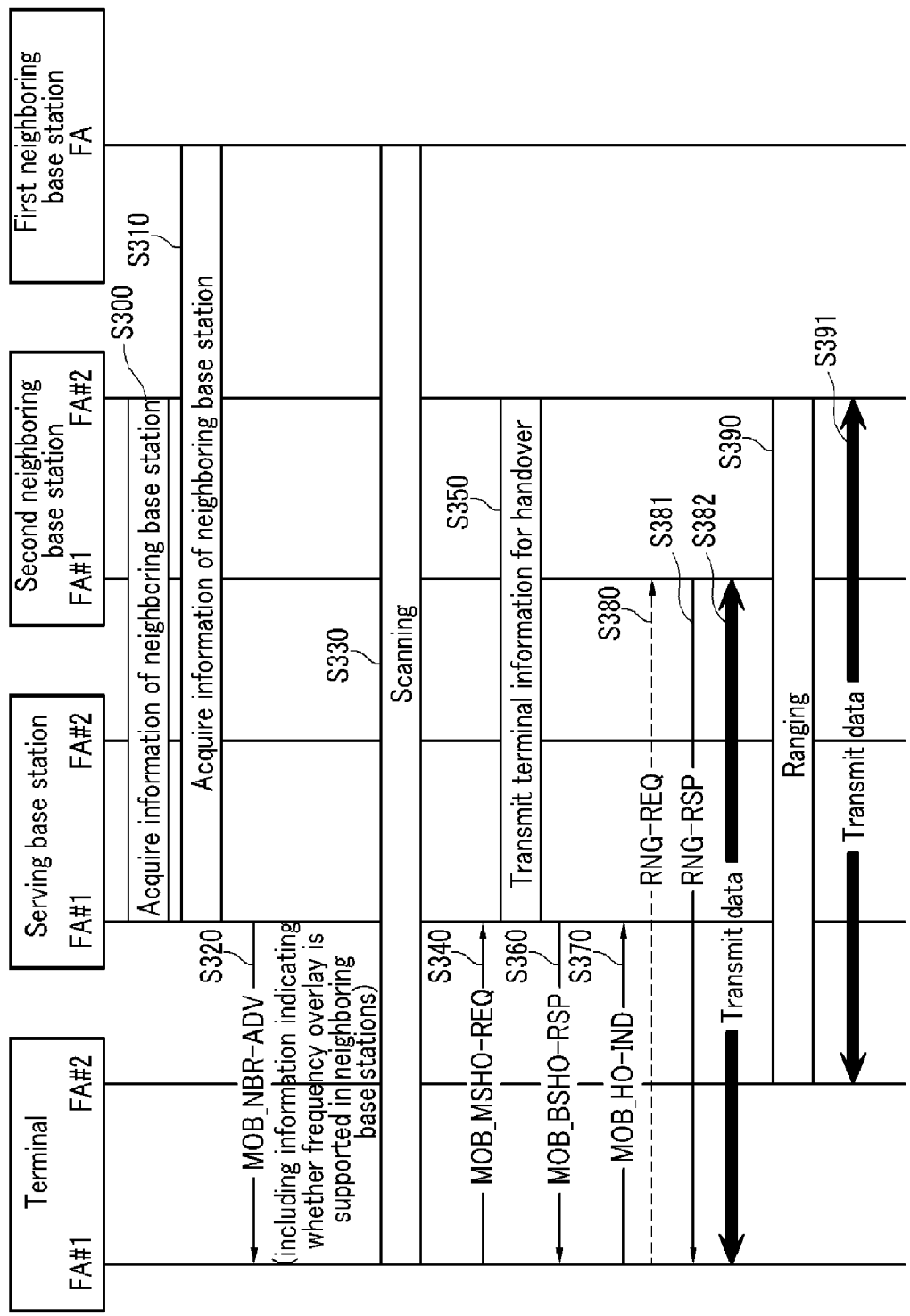
FIG. 6 is a flowchart illustrating a handover method according to an exemplary embodiment of the present invention.

The procedure that is shown in FIG. 7 is substantially the same as the procedure of the handover method shown in FIG. 6 except that, after the serving base station 200-1 receives a MOB_MSHO-REQ message as an MS handover request message from the terminal 100, the serving base station 200-1 transmits session information and setting information of the terminal 100 that has requested handover to the second neighboring base station 200-3 as the candidate base station (S350). That is, in the case of FIG. 7, the serving base station 200-1 includes a non-adjacent FAs supported parameter as a parameter indicating whether FAs of the terminal 100 can use non-adjacent frequency bands in a message used to transmit information of the terminal 100 that has requested the candidate base station 200-3 to perform handover, and transmits the corresponding message (S350'). When the value of the non-adjacent FAs supported parameter is set to "1", it indicates that the terminal that has requested to perform handover can perform communication through FAs having not only adjacent frequency bands but also non-adjacent frequency bands. When the value of the non-adjacent FAs supported parameter is set to "0", it indicates that the terminal that has requested to perform handover can perform communication through FAs having only adjacent frequency bands.

As such, the serving base station 200 transmits to the candidate base station information indicating whether the terminal 100 can perform communication through FAs having non-adjacent frequency bands. As a result, when the terminal 100 performs handover to the neighboring base station 200-3, the terminal can perform communication through FAs having adjacent frequency bands or FAs having non-adjacent frequency bands according to the characteristics of the terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of broadcasting in a serving base station of a wideband wireless access system, the method comprising:
   exchanging information with neighboring base stations to confirm whether frequency overlay is supported in each of the neighboring base stations;
   generating a neighboring base station advertisement message that includes indicators identifying whether frequency overlay is supported in the neighboring base stations, the indicators comprised in a type length value (TLV) parameter of the neighboring base station advertisement message; and
   broadcasting the generated neighboring base station advertisement message to terminals that belong to a coverage area of the serving base stations;
   wherein each indicator in the neighboring base station advertisement message has a first value for the neighboring base stations that support frequency overlay and a second value for the neighboring base stations that do not support frequency overlay.

2. The method of claim 1, wherein the TLV parameter of the neighboring base station advertisement message comprises a NEIGHBOR_FO parameter that includes a single bit for each neighboring base station identifying one of: the first value indicating that frequency overlay is supported by the neighboring base station and the second value indicating that frequency overlay is not supported by the neighboring base station.

3. The method of claim 1, wherein the serving base station uses a frequency band allocated to one of a plurality of frequency assignments (FAs) to broadcast the neighboring base station advertisement message.

4. The method of claim 1, wherein exchanging the information includes:
   determining whether neighboring base stations exist;
   when neighboring base stations exist, counting a number of neighboring base stations;
   for each counted neighboring base station, confirming whether the corresponding neighboring base station supports frequency overlay and, when the corresponding neighboring base station supports frequency overlay, determining the corresponding neighboring base station as a frequency overlay supporting base station; and
   determining the counted number of neighboring base stations as a final number of neighboring base stations;
   wherein, in the generating of the neighboring base station advertisement message, the final number of neighboring base stations is included in the neighboring base station advertisement message.

5. The method of claim 4, wherein confirming whether the corresponding neighboring base station supports frequency overlay comprises determining whether the corresponding neighboring base station belongs to a communication system supporting frequency overlay.

6. A method of receiving in a terminal of a wideband wireless access system, the method comprising:
- receiving a neighboring base station advertisement message broadcast from a serving base station, the neighboring base station advertisement message including indicators identifying whether frequency overlay is supported in neighboring base stations, the indicators comprised in a type length value (TLV) parameter of the neighboring base station advertisement message;
- confirming whether frequency overlay is supported for each of the neighboring base stations identified in the neighboring base station advertisement message; and
- storing information that indicates whether frequency overlay is supported in each of the neighboring base stations;
- wherein each indicator in the neighboring base station advertisement message has a first value for the neighboring base stations that support frequency overlay and a second value for the neighboring base stations that do not support frequency overlay.

7. The method of claim 6, further comprising:
- using a frequency band allocated to one of a plurality of frequency assignments (FAs) to receive the neighboring base station advertisement message.

8. The method of claim 6, wherein confirming whether frequency overlay is supported in each of the neighboring base stations and storing information that indicates whether frequency overlay is supported in each of the neighboring base stations include:
- determining whether neighboring base stations exist based on a number of neighboring base stations included in the neighboring base station advertisement message; and
- when the neighboring base stations exist, for each of the neighboring base stations:
  - confirming whether frequency overlay is supported in the corresponding neighboring base station; and
  - when the corresponding neighboring base station supports frequency overlay, determining the corresponding neighboring base station as a frequency overlay supporting base station and storing information of the corresponding neighboring base station.

9. A handover method in which a serving base station of a wideband wireless access system performs handover, the handover method comprising:
- broadcasting a neighboring base station advertisement message including indicators identifying whether frequency overlay is supported in neighboring base stations, the indicators comprised in a type length value (TLV) parameter of the neighboring base station advertisement message;
- receiving a list of candidate base stations where handover is possible from a terminal, the candidate base stations being selected based on the indicators included in the broadcast neighboring base station advertisement message and network information of neighboring base station by measuring quality of downlink signals received from the neighboring base stations;
- transmitting handover information of the terminal to the candidate base stations, wherein the handover information includes information indicating whether the terminal can use non-adjacent frequency bands;
- selecting a recommended base station from among the candidate base stations and transmitting information of the recommended base station to the terminal; and
- receiving a handover instruction from the terminal;
- wherein each indicator in the neighboring base station advertisement message has a first value for the neighboring base stations that support frequency overlay and a second value for the neighboring base stations that do not support frequency overlay.

10. The handover method of claim 9, wherein, when the serving base station and the terminal support frequency overlay, the serving base station and the terminal transmit information for handover through one of a plurality of frequency assignments (FAs).

11. The handover method of claim 9, wherein, when the terminal supports frequency overlay, the handover information transmitted to the candidate base stations includes information indicating whether the terminal can perform communication through non-adjacent frequency bands.

12. A handover method in which a terminal of a wideband wireless access system performs handover, the method comprising:
- receiving a neighboring base station advertisement message that is broadcast from a serving base station, the neighboring base station advertisement message including a list of neighboring base stations and indicators identifying whether frequency overlay is supported in the neighboring base stations, the indicators comprised in a type length value (TLV) parameter of the neighboring base station advertisement message;
- measuring quality of downlink signals received from the neighboring base stations and acquiring network information of neighboring base stations;
- selecting candidate base stations for the handover from among the neighboring base stations based on the indicators and the network information of neighboring base stations;
- transmitting a list of the selected candidate base stations to the serving base station;
- selecting one destination base station from among a list of recommended base stations received from the serving base station and instructing the serving base station to perform handover; and
- performing handover to the destination base station that previously knew whether the terminal can use non-adjacent frequency bands based on handover information transmitted from the serving base station before performing the handover;
- wherein each indicator in the neighboring base station advertisement message has a first value for the neighboring base stations that support frequency overlay and a second value for the neighboring base stations that do not support frequency overlay.

13. The handover method of claim 12, wherein, when the terminal supports frequency overlay, the candidate base stations are selected from among the neighboring base stations that support frequency overlay.

14. The handover method of claim 13, wherein, when the terminal and the serving base station support frequency overlay, the terminal and the serving base station transmit information for handover through one of a plurality of frequency assignments (FAs).

15. The handover method of claim 14, wherein the handover to the destination base station is performed through one of the FAs, the method further comprising performing a subsequent handover through another of the FAs when the handover is completed.

16. The handover method of claim 14, further comprising:
- using a frequency band allocated to one of the FAs to receive the neighboring base station advertisement message.

17. The handover method of claim 12, wherein the list of the selected candidate base stations is included in a handover request message to the serving base station.

18. The handover method of claim 17, wherein the list of recommended base stations received from the serving base station is included in a handover response message.

19. The handover method of claim 17, wherein the handover request message transmitted to the serving base station further includes information indicating whether the terminal can perform communication through non-adjacent frequency bands.

20. The handover method of claim 12, wherein selecting the candidate base stations for the handover from among the neighboring base stations comprises performing a scanning process that includes measuring a quality of downlink signals received from the neighboring base stations.

* * * * *